Feb. 27, 1951 M. N. FAIRBANK 2,543,160
PHOTOGRAPHIC APPARATUS
Filed April 30, 1948 3 Sheets-Sheet 2

INVENTOR
Murry N. Fairbank
BY Donald L. Brown
and Oliver W. Hayes
Attorneys

Patented Feb. 27, 1951

2,543,160

UNITED STATES PATENT OFFICE 2,543,160

PHOTOGRAPHIC APPARATUS

Murry N. Fairbank, Belmont, Mass., assignor to Polaroid Corporation, Cambridge, Mass., a corporation of Delaware Application April 30, 1948, Serial No. 24,127

22 Claims. (Cl. 95—13)

The present invention relates to photography and more particularly to novel photographic apparatus which is an improvement over the apparatus shown in United States Patent No. 2,435,717, and comprises a camera or the like of the type wherein a body of processing liquid is released between two superposed sheets adjacent an edge of a photosensitive area on one of said sheets and is spread between these sheets by translating the bulk of liquid across said area.

It is a principal object of the present invention to provide such an apparatus which is capable of spreading the released liquid in a layer of predetermined uniform thickness between the sheets, despite wide variations in the thicknesses of the two sheets.

Another object of the invention is to provide an apparatus of the above character which automatically adjusts the liquid-spreading means to give a predetermined layer of spread liquid, the thickness of the layer being determined either by means associated with the apparatus, or by a combination of such means and means associated with one or both of the sheets.

Still another object of the invention is to provide an apparatus of the above type which will additionally act to trap excess processing liquid during the spreading thereof between the sheets which might otherwise escape from the assembly formed by the two superposed sheets.

These and other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein.

The present invention relates generally to photographic apparatus, for example a hand-held camera or the like, wherein means are provided for positioning a photosensitive sheet material within the camera, means are included for positioning a predetermined area of the photosensitive material in exposure position and means, preferably the camera housing provides a dry-processing chamber. Within this chamber means are provided for releasing and spreading a processing liquid between the exposed photosensitive sheet and another sheet superposed in an operative assemblage therewith. In a preferred form of the invention, one of these sheets has at least one liquid-carrying container associated therewith, this container being preferably of the type adapted to have its contained liquid released by the application of mechanical force thereto. The container is preferably positioned on that surface of the second sheet which is adapted to be brought into face-to-face superposed relationship with the photosensitive sheet.

In the preferred form of the invention, the liquid-releasing and spreading means act to apply pressure to the two sheets, with the container therebetween, so as to release the bulk of the liquid and spread this liquid across the exposed area and between the two sheets. The present invention is specifically directed to the accomplishment of a uniform spreading of this released liquid irrespective of overall variations in thickness of the sheets and in accordance with predetermined conditions established either by the apparatus alone or by the apparatus and one or both of the sheets.

For accomplishing this uniform spreading, the liquid-spreading means preferably comprises liquid-spreading members and means for gauging the thickness of the edges of the two sheets comprising the assemblage within which the liquid is to be spread and for predeterminedly spacing apart the liquid-spreading surfaces in accordance with the gauged thickness. This gauging means includes, in a preferred form, cooperating portions for engaging said superposed assemblage adjacent one edge thereof and other cooperating portions for engaging said superposed assemblage adjacent the other edge thereof. Between the edge-engaging portions are liquid-spreading portions of the pair of members, these portions having cooperating converging liquid-spreading surfaces, at least one of which is preferably convexly curved. At lease one of the members is movably mounted for movement towards and away from the other member and means are provided for resiliently urging the movably mounted member towards said other member under a force greater than the force produced by the pressure generated in the liquid during the spreading thereof. The edge-engaging portions are so related to the members as to space said converging surfaces apart a predetermined distance greater than the spacing existing between said edge-engaging portions when the latter are operatively associated. These latter portions are operative to move said movable member to cause the spacing of said liquid-spreading surfaces to increase upon any increases in thickness of said sheets and allow said resilient means to move said member to decrease the spacing of said surfaces upon any decreases in thickness of said sheets. This arrangement of the portions of the liquid-spreading means permits a separation of the two sheets of the assemblage, as the latter are advanced between the liquid-spreading surfaces, which is independent of the thickness of said sheets.

In one preferred form of the invention the edge-engaging portions comprise means rigidly connected to the movably mounted member so that when said means moves as a result of variations in the thickness of said sheets, it causes a corresponding movement of said movably mounted member. In a preferred form of the apparatus embodying one aspect of the invention, the edge-engaging means is formed integrally with the movably mounted member and constitutes a pair of shoulders cooperating with corresponding portions of the other member. These shoulders extend beyond the surface of the movably mounted member towards the other member to engage marginal superposed edges of the assemblage as the assemblage passes between the liquid-spreading surfaces and thus predeterminedly space the liquid-spreading surfaces apart a predetermined amount greater than the edge thickness of the assemblage. The shoudlers also act to create high pressure areas adjacent the marginal edges of the two superposed sheets and additionally serve to prevent leakage, past these marginal edges, of liquid being spread.

Figure 1:
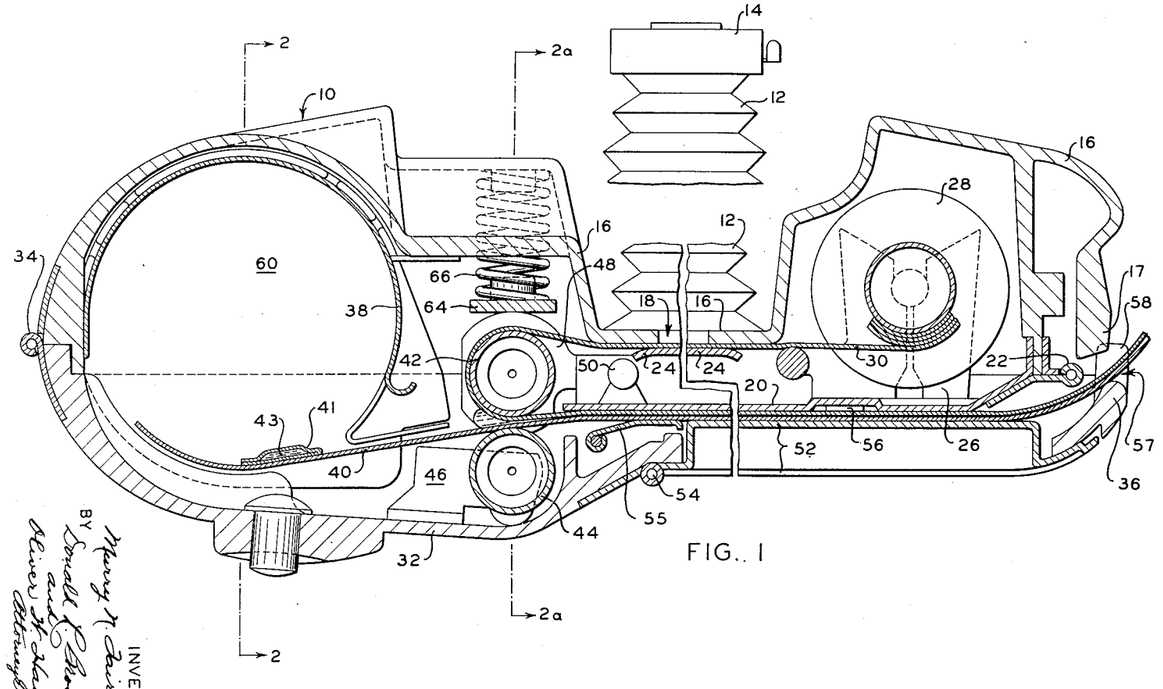
Figure 1 is a diagrammatic fragmentary sectional view of one preferred modification of the invention shown in the form of a hand-held camera.
Figure 2:
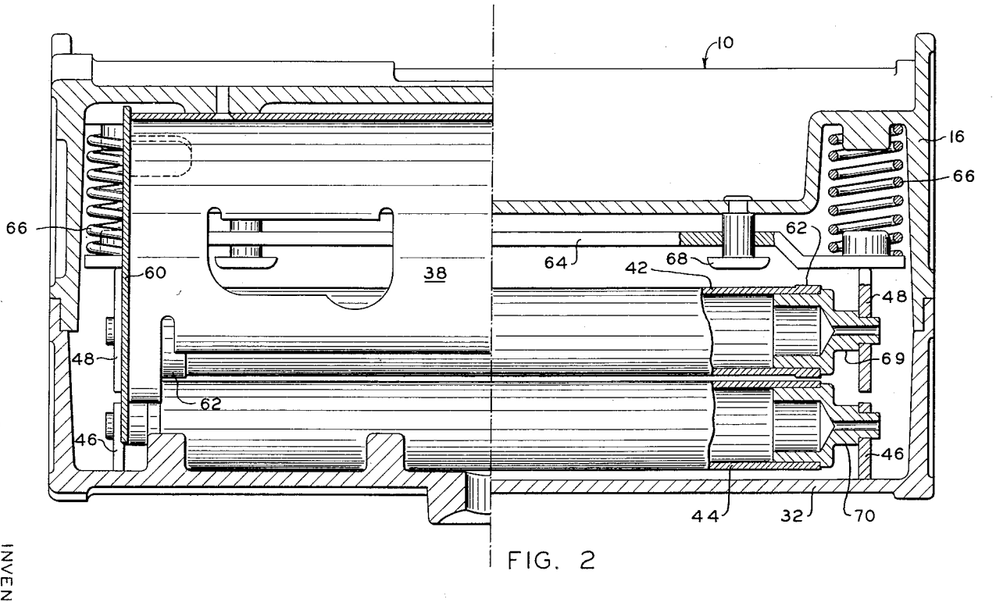
Fig. 2 is a sectional view of the camera of Fig. 1 with the two sheets omitted, the right half of Fig. 2 being a section primarily along the line 2a—2a, and the left-hand portion of Fig. 2 being a section along the line 2—2.

Referring now to Figs. 1 and 2, there is shown one preferred modification of the invention as embodied in a hand-held camera which is particularly adapted for producing a positive image from a latent negative image created as the result of exposure of a sheet including a silver halide photosensitive stratum. The camera includes a housing, generally indicated at 10, which provides a dry-processing chamber and prevents access of actinic light to a photosensitive sheet held thereby. The housing supports a bellows indicated at 12 connected to a shutter and lens assembly diagrammatically shown at 14 for permitting exposure of the photosensitive sheet carried by the camera. A front portion 16 of the housing has an exposure opening 18 therein and also supports a partition member 20 lying in back of the exposure opening 18. The partition 20 is preferably pivotally connected to the front portion 16 by means such as a hinge 22. The partition 20 also preferably carries a pressure plate 24 adapted to hold the photosensitive layer flat in the focal plane of the camera so as to permit accurate exposure thereof. A spool holder 26, for positioning a spool 28 carrying a roll of photosensitive film 30, is preferably secured to the partition 20 to permit easy loading of the spool 28 into the camera. The camera also includes a back cover portion, generally indicated at 32, this cover being suitably hinged, as by means of a hinge 34, to the camera housing. As can be seen, the right-hand end 36 of back cover 32 forms a mouth 57 with the right-hand end, indicated at 17, of the front portion 16 of the camera. The edges of this mouth 57 are indicated at 58. Secured to the housing 10 is a means for supporting a second roll of sheet material, this means being schematically indicated at 38 as comprising a semicylindrical housing adapted to confine a roll 40 of this second sheet material.

At 42 and 44, there is indicated a pair of liquid-spreading members, these two members being shown, in a preferred form, as comprising a pair of pressure rolls having intermediate cylindrical portions defining liquid-spreading surfaces. The bottom roll 44 is supported by a suitable bracket such as shown at 46 which, for convenience of loading, is rigidly secured to the back cover 32. The upper pressure roll 42 is movably mounted by means such as a pair of end plates 48 pivotally secured to the partition 20 by means such as a pin indicated at 50. A resilient load is applied to roll 42 by a pressure bar 64 adapted to bear on end plates 48, the pressure bar being urged downwardly by means such as a pair of springs shown at 66. A retaining pin 68 is provided for preventing more than a predetermined movement of pressure bar 64 with respect to the front portion 16 of the camera housing.

Figures 1A, 2A, 3, 4:
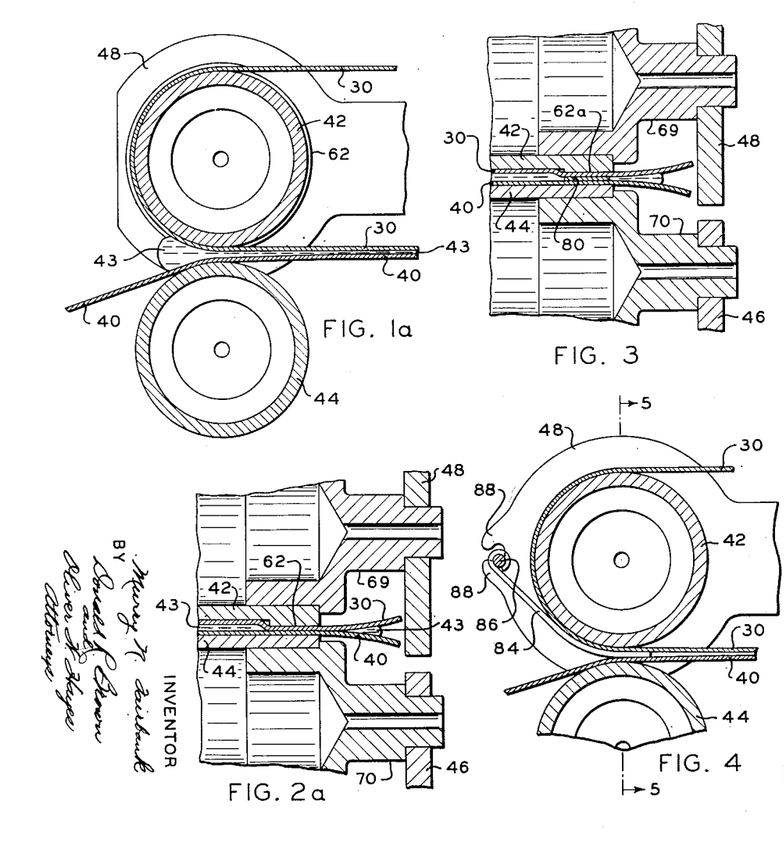
Fig. 1a is an exaggerated enlarged fragmentary sectional view of a portion of Fig. 1.
Fig. 2a is an enlarged exaggerated view of the right-hand side of Fig. 2, with the two sheets and the processing liquid shown in their operative relation.
Fig. 3 is a sectional view similar to Fig. 2a in which a slightly modified product embodying one aspect of the invention is shown.
Fig. 4 is a sectional view of Fig. 1a showing still another modification of the invention.

Referring now more particularly to Figs. 2 and 2a, there is shown more clearly one preferred form of the edge-engaging portions of the liquid-spreading means mentioned previously. In this form of the invention the edge-engaging portions comprise means rigidly secured to the movably mounted roll 42 and are shown as being integrally formed therewith. These means include, in a preferred embodiment, a pair of shoulders 62 positioned on the marginal edges of the intermediate cylindrical portion of roll 42. These shoulders have a radius greater than that of the roll 42 by an amount predetermined by the desired thickness for the layer of liquid to be spread. In one preferred form of the invention, the shoulder radius is greater, by about 4 to 6 thousandths of an inch, than the radius of the liquid-spreading portion of the roll. These two shoulders, in cooperation with corresponding portions of roll 44, control the spacing of the liquid-spreading surfaces and adjust this spacing so that it remains greater than the edge thickness of the assemblage by a constant amount which is substantially equal to the height of these shoulders, this amount remaining substantially constant despite variations in thickness of these two sheets.

In a preferred form of the invention, there are provided a number of edge-guiding surfaces which are adapted to maintain at least the two edges of the photosensitive layer lined up in two parallel planes during the movement of the photosensitive layer from storage position past the processing members and out of the camera. These edge-guiding means preferably define these two planes. The first guiding means comprises the pair of inner surfaces of the flanges of film spool 28, the film spool-holding means 26 being adapted to accurately position this film spool in the camera. The second guiding means is the pair of inner surfaces of the end plates 48 which hold the upper pressure roll 42. The third means comprises a pair of studs 56 secured to the partition 20. The last means comprises the two edges 58 of the mouth 57. In a preferred form of the invention, each set of these four elements, i. e., the inner surface of one spool flange, the inner surface of one end plate 48, one stud 56 and one mouth edge 58, preferably lies in a common plane. For maintaining the other sheet aligned with the photosensitive sheet, the cylindrical container 38 which supports the roll of the second sheet also preferably includes end plates 60 which are substantially parallel to the plane defined by the four above-described members. The two end plates 60 are preferably spaced apart by a distance very slightly greater than the transverse dimension of the second roll of material. When the second sheet of material is a few thousandths of an inch narrower than the photosensitive sheet, the planes defined by end plates 60 are preferably spaced a few thousandths of an inch inwardly of the two planes defined by the means for guiding the edges of the photosensitive sheet.

Another important feature of the invention is embodied in the preferred construction described above wherein the pair of shoulders 62 additionally act to create barriers adjacent the marginal edges of the two superposed sheets and thus additionally assist in preventing leakage of the viscous liquid past these barriers. The present invention provides for trapping liquid escaping beyond the shoulders by providing low pressure areas externally thereof adjacent the edges of the two superposed sheets and within the two edge-guiding planes referred to above. In the preferred form shown, for example in Figs. 2 and 2a, the ends of the pressure rolls 42 and 44 are of reduced diameter as shown respectively at 69 and 70. The portions of the two sheets existing between these two reduced portions 69 and 70 are under substantially no pressure other than that inherent in the stiffness of the two sheets; therefore the viscous liquid existing between these two edge portions of the sheets is under substantially no pressure and does not spread beyond the edges of the sheets. Since these edges are relatively free for movement away from each other under very low pressure they can hold a considerable quantity of any viscous liquid which has escaped beyond shoulders 62 and act to trap this liquid, and so prevent its contacting any portion of the apparatus.

The particular arrangement of the resilient means 56 and the mounting means 48 of the movable roll 42 has the advantage that roll 42 is permitted to tilt with respect to the other roll, while their axes remain substantially coplanar, thus allowing roll 42 to adjust itself for transverse irregularities in the sheets forming the superposed assemblage.

In a preferred form of the invention, the rear cover 32 includes a door 52, this door being pivotally secured to back cover 32 by means such as a pin 54. A light seal blade 55 is preferably suitably mounted on cover 32 for preventing access of light to the roll portion of the camera when door 52 is opened. Suitable other light seals and latches are provided for maintaining the light-tightness of the various portions of the camera.

In a preferred form of process embodying the present invention the photosensitive sheet 30 comprises a base carrying on one surface thereof a stratum of a silver halide photosensitive material adapted to be exposed to actinic light to create therein a latent negative image. The other sheet material 40 is preferably adapted to carry on its surface a positive image of the subject matter of the latent negative image created in the photosensitive stratum as a result of the exposure thereof. This sheet may comprise an opaque white paper such as baryta paper and the liquid 43 carried by the container 41 preferably includes at least part of the ingredients for developing the latent negative image and forming the positive image on the surface of the image-carrying sheet 40. This liquid is preferably quite viscous, in the neighborhood of 1 thousand to 200 thousand centipoises, and preferably comprises a developer, a silver halide solvent, an alkali and a viscosity-increasing film-forming material such as an alkali-inert polymer. The container 41 is preferably formed of a paper-backed metal foil having an alkali-inert lining material, the foil being folded upon itself, sealed at the two ends and along the edge opposite the fold, this edge having a weaker seal than the two end seals so that, when the container is compressed, the liquid can be discharged therefrom along the sealed edge thereof.

In the use of the preferred modification of the invention shown and described above, the back cover 32 is opened and the partition 20 is swung to the rear, thus exposing both sheet-holding means. The spool 28 carrying the roll of photosensitive sheet 30 is then placed in the spool holder 26. A leader portion of the photosensitive sheet is brought across backing plate 24, placed between end plates 48 and led around roll 42. Partition 20 is now moved to closed position and the roll of image-carrying sheet 40 is placed in the holder 38 therefor. A leader portion of the sheet 40, aligned with, and preferably joined to, the leader portion of the photosensitive sheet 30, is led along the back of partition 20, between lugs 56 and between the edges 58 of the mouth 57. The back cover is then closed, thus making the camera light-tight. The lens and shutter assembly is moved into proper position. An area of photosensitive sheet is next positioned in the focal plane of the camera behind the opening 18 by pulling that portion of the leaders for the two sheets 30, 40 which extend from mouth 57 until such positioning is indicated by a mark or other means. Exposure is now made. At this point, one of the containers 41 should be positioned so that it will be so aligned with the leading edge of the exposed area as to be able to discharge the bulk of its confined liquid in advance of this leading edge. As the container passes between the pressure rolls 42, 44 the hydraulic pressure within the contained liquid is increased to a point where the container seal is ruptured and the liquid is forced from the container. During the release of the liquid from the container the resilient mounting of roll 42, since it allows this roll to move, obviates a very large increase in pull force caused by the increased thickness of the materials passing between the rolls, this increased thickness being due to the presence of the container walls and also the liquid before the container seal is ruptured.

As the sheets move between the rolls with the bulk of the released viscous liquid between the sheets on the entrance side of the rolls, a pressure is built up within the liquid. This pressure forces the two sheets against the surfaces of the pressure rolls so that these sheets, at least in the vicinity of the space between the rolls, conform to the surfaces of these two rolls. This feature of the invention is particularly shown in Figs. 1a and 2a, Fig. 1a showing the longitudinal conformation and Fig. 2a showing the transverse conformation. As can be particularly seen from Fig. 2a, this conformation of the sheets provides a space between inner surfaces thereof which is substantially equal in thickness to the height of the shoulders on the roll 42. Therefore, the liquid between the closest portions of the two rolls exists in a layer having a thickness substantially equal to the height of the shoulders 62. The liquid at this portion will have a movement relative to the travel of the sheets which is dependent upon the angle of the throat formed by the converging pressure-applying surfaces, as explained in the copending application of Edwin H. Land et al., Serial No. 790,064, filed December 6, 1947 (now Patent No. 2,483,014, issued September 27, 1949). With the form of the invention shown, where the rolls have small radii and their converging liquid-spreading surfaces form arcs of short radii, the throat angle is high and the liquid will be moving counter to the sheets, thus giving a final thickness of spread less than the thickness of the layer between the rolls. As the radii of these arcs are increased, the differential in flow of the liquid is decreased, thus increasing the thickness of the final spread layer of liquid. When the sheets converge, as shown in Figs. 1 and 1a, the reduction in thickness between the layer of liquid existing between closest points of the pressure rolls and the final thickness of the spread liquid is around 3 to 1, or 3 to 2. As the radii of the converging pressure-applying surfaces increase up to infinity (i. e., where they are substantially flat and parallel), the ratio between the two layer thicknesses may decrease to about 1 to 1 or less, in which case the final spread thickness is greater than the thickness of the liquid layer existing between the closest portions of the liquid-spreading surfaces.

It should be pointed out in connection with the above discussion that where the sheets have considerable stiffness with respect to the pressure generated within the liquid, the thickness of final spread may be considerably greater than would normally be anticipated in view of the radius of the liquid-spreading surfaces between which the sheets pass. This is found particularly in those cases where the sheets are fed in such a fashion that only the liquid pressure tends to force the sheets into surface-conforming relationship with the liquid-spreading surfaces. Treatments which increase the friction of one or both of the sheets with respect to the liquid will give an increased thickness of final spread. Conversely, treatments which lower the friction of the sheets will ordinarily be found to decrease the thickness of spread liquid, other conditions being the same.

The liquid spread between the sheets 30 and 40 laminates these two sheets together and accomplishes the desired processing thereof, this processing preferably comprising the concurrent development of a negative on sheet 30 and a positive on sheet 40 while the two sheets are in the dark chamber defined by the partition 20 and rear cover 32. At the conclusion of the processing, door 52 is opened so that the image-bearing portion of sheet 40 may be removed from the camera. This image-bearing portion is preferably defined by perforations which permit ready separation of the positive from the remainder of sheet 40. This leaves the nonimage-bearing portion of sheet 40 laminated to sheet 30 so that these two sheets can act as a leader for permitting pulling of the succeeding exposed area between the rolls 42, 44 and into the dark chamber.

Referring now to Fig. 3, there is shown a somewhat modified product embodying the present invention. For simplicity of illustration this form of the invention has been shown as applied to an apparatus substantially identical to that shown in the previously discussed figures. In Fig. 3, like numbers refer to like elements of the previous figures. In the form of the invention shown in Fig. 3, a portion of the spacing means is shown as a part of the product of the present invention and so positioned as to operate upon the apparatus to control the spacing of the liquid-spreading members to give a spacing therebetween which is greater than the thickness of the sheets being superposed between these two liquid-spreading members by a fixed predetermined amount. As shown, the portion of the spacing means fixed to the product comprises a relatively incompressible strip 80 positioned on marginal edges of one of the two sheets being superposed. For convenience of assembly, this strip is preferably secured to the image-carrying sheet 40. With this modification of the invention, the shoulder carried by the movable roll 42 is indicated at 62a and is smaller than shoulder 62 of Figs. 1a and 2a. Thus, that portion of roll 42 which engages the two superposed layers adjacent the sheet-spacing strip 80 has a slightly larger diameter than that portion of the roll defining the liquid-spreading surface. In one preferred form of the invention, the strip 80 is formed of a relatively incompressible material such as hard calendered paper, cellulose acetate or the like; it may have a thickness on the order of 1.5 to 4 thousandths of an inch.

In the use of the modification of the invention shown in Fig. 3 the shoulders 62a and the pair of strips 80 control the spacing of the inner surfaces of the two sheets 30 and 40 by separating the two rolls 42, 44 an amount greater than the thicknesses of the sheets 30 and 40 equal substantially to the combined thickness of the shoulders 62a and the marginal strips 80. In such a modification of the invention the thickness of spread liquid is controlled by the same conditions applying to the previously described modification, the only difference being that, at the marginal edges of the area to be covered by the spread liquid, the stiffness of one of the sheets does not have to be taken into consideration to the extent necessary when shoulders alone are provided for spacing since not as much deformation of one of the sheets is required at this point.

It should be noted in connection with the discussions of Fig. 3 above that the marginal strips 80 additionally create barriers at the margins of the superposed layers, thus acting to form edge seals therefor which cooperate with the reduced portions at the ends of the pressure rolls to trap escaping liquid between the edges of the two sheets, in the same manner as discussed in connection with Fig. 2a above.

The invention of Fig. 3 is particularly advantageous for two reasons. In the first place, it permits a variation of thickness of spread in a camera provided with a pair of pressure rolls, one of which has a fixed pair of enlarged shoulders thereon, without changing pressure rolls. In the second place, it enables the use of relatively thin marginal strips which do not interfere with the rolling up of the sheet to which the strips are secured, these strips being adjusted, during manufacture, for optimum spread thickness.

Figure 5:
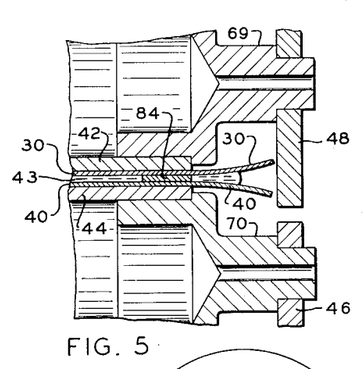
Fig. 5 is a sectional view of Fig. 4, taken along the line 5—5.
Figure 6:
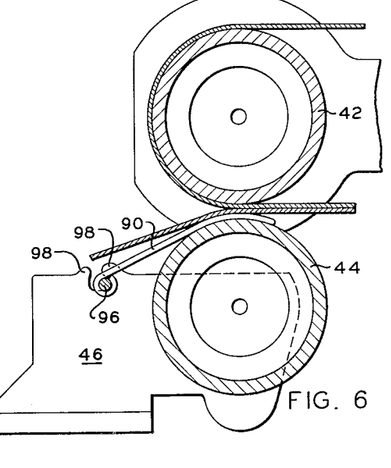
Fig. 6 is a sectional view similar to Fig. 4 of still another form of the invention.

Referring now to Figs. 4, 5 and 6, where like numbers refer to like elements in the other figures, there are shown still other forms of the invention wherein sheet-gauging or spacing means are provided which extend between marginal portions of the liquid-spreading members. In the form shown in Figs. 4 and 5, the spacing means extend between edge portions of the two sheets passing between the converging liquid-spreading surfaces and these spacing means are held stationary so that the two sheets slide with respect thereto. In a preferred form of this embodiment of the invention these spacing means comprise a pair of edge-engaging elements, such as strips secured, for convenience, to a portion of the camera such as the end-mounting plates 48 carrying the movable pressure roll 42. One of these strips is indicated at 84 and is shown as being secured at one end to a support means, such as a rod 86. The rod 86 is preferably carried by projecting lugs 88 formed in the end of roll-mounting plate 48. The spacing strips 84 are preferably placed in operative position after photosensitive sheet 30 has been led around roll 42 and before the image-carrying sheet 40 is superposed therewith during the loading of the camera. Thus, when the camera is fully loaded the two spacing strips 84 exist between marginal portions thereof and act to space the rolls apart a distance greater than the thickness of the two sheets. Spacing strips 84 are preferably formed of a relatively incompressible smooth material having relatively high tensile strength such as stainless steel shim stock. These strips have a thickness dependent upon the final desired thickness of spread liquid, as discussed in connection with the preceding figures. Equally, the spacing strips 84 may be used in addition to roll shoulders and/or marginal strips 80 secured to the paper. One feature of the embodiment of the invention shown in Fig. 5 resides in the ease with which the spacing of the inner surface of the rolls may be changed. For example, where a much thicker layer of processing liquid is desired than would ordinarily be employed, such as might be the case where development and complete fixation of the negative is of utmost importance, relatively thick marginal spacing strips 84 can be inserted in the camera to give this thicker spread of liquid.

In the form of the invention shown in Fig. 6, marginal spacing strips are provided for spacing the edge portions of the rolls apart by a predetermined amount greater than the thickness of the edge portions of the assemblage, these strips being positioned adjacent one roll so that the two sheets pass between these strips and the other roll. As shown in Fig. 6, the two spacing strips, one of which is indicated at 90, are positioned so that they are in engagement with fixed roll 44 at the marginal portions thereof. A convenient means of holding these spacing strips 90 against movement with the sheets comprises a rod 96 held by a pair of lugs 98 formed in the roll-mounting member 46. As can be seen, the spacing strips 90 effectively increase the diameter of roll 44 at the margins thereof so that this roll acts as if it had shoulders with a radius greater than the cylindrical liquid-spreading portion of the roll by an amount equal to the thickness of each strip 90. These spacing strips 90 thus maintain the liquid-spreading surfaces spaced apart an amount greater than the edge thickness of the superposed assemblage substantially equal to the thickness of each strip.

While several preferred forms of the invention have been shown in the figures described above, considerable modifications thereof may be made without departing from the scope of the present invention. For example, where shoulders are provided, such as in Figs. 1 through 3, these shoulders may be on either roll, or on both rolls. Equally, one shoulder may be provided on one roll and the other shoulder may be provided on the other roll. These shoulders may be removably secured to the rolls so as to permit changes in the spacing of the rolls. In addition, only one shoulder at the end of one roll may be provided in those cases where the mounting of the movable roll is such as not to permit tilting of the axis thereof with respect to the axis of the other roll. The same is true with respect to the spacer strips and only one spacer strip need be provided in those cases where the axis of the movably mounted roll remains parallel to the axis of the fixed roll.

Additionally, in some cases it may be desirable to provide stops in connection with the movably mounted roll so as to prevent more than a maximum separation of the two rolls. This modification of the invention is particularly advantageous in those cases where it is desired to apply a high pressure to the container during the release of liquid therefrom, in which case the rolls are not permitted to separate as much as the thickness of the two sheets and the filled container. In some cases, it is also advantageous to provide stops for the movable roll to assure a minimum separation of the rolls. This modification of the invention is advantageous where the pressure rolls are not so mounted as to be readily moved apart during the loading of the sheets into the camera.

Equally, it may be desirable to have both of the pressure rolls resiliently mounted for movement towards each other and such a modification of the invention is considered within the scope thereof.

While the above discussion of the invention has been directed primarily to preferred forms thereof wherein rotatably mounted pressure rolls are provided for spreading the released liquid, other forms of the invention contemplate the use of nonrotatably mounted rolls and other converging liquid-spreading surfaces of the type shown in the copending application of Edwin H. Land, Murry N. Fairbank and David S. Grey, Serial No. 790,064, filed December 6, 1947. With such modifications of the invention, one of the members is movably mounted and the spacing or gauging means of the type shown in Figs. 1 through 3, or the type shown in Figs. 4 through 6 is provided.

The preferred form of the invention comprises the use of pressure rolls or other liquid-spreading members which are held stationary in the camera, while the two sheets of the assemblage are advanced therepast. In less preferred forms of the invention however, the liquid-spreading action may take place while the two sheets remain stationary and the pressure members are moved with respect thereto.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a first liquid-spreading member having a liquid-spreading surface, means for mounting said member, a second liquid-spreading member having a liquid-spreading surface, means for mounting said second member, at least one of said surfaces being a convexly curved surface and defining a converging mouth with the other of said surfaces, one of said mounting means permitting movement of its member with respect to the other of said members, and means for urging said movably mounted member towards said other member, cooperating portions of said liquid-spreading means engaging one margin of said superposed sheet assembly and other cooperating portions of said liquid-spreading means engaging the other margin of said assembly, said cooperating margin-engaging portions maintaining said liquid-spreading surfaces spaced apart a predetermined amount greater than the thickness of the margins of said assembly.

2. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a first liquid-spreading member, means for mounting said member, a portion of said member having a convexly curved surface, a second liquid-spreading member having a convexly curved surface, means for mounting said second member to permit movement of said second member towards said first member, said two mounting means holding said two members so that said two convexly curved surfaces form a converging mouth, at least one shoulder fixedly secured to one of said members adjacent one end of said convexly curved surface thereof, said shoulder maintaining said two surfaces spaced a predetermined distance apart upon engagement of said shoulder with said first member, and means for resiliently urging said second member towards said first member so that said shoulder engages the other member.

3. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a first liquid-spreading member, means for mounting said member, a portion of said member having a convexly curved surface, a second liquid-spreading member having a convexly curved surface, means for mounting said second member to permit movement of said second member towards said first member, said two mounting means holding said two members so that said two convexly curved surfaces form a converging mouth, a pair of shoulders fixedly secured to one of said members adjacent the ends of said convexly curved surface thereof, said shoulders maintaining said two surfaces spaced a predetermined distance apart upon engagement of said shoulders with the other member, and means for resiliently urging said second member towards said first member, said urging means maintaining said shoulders in engagement with margins of said assembly while the opposite surface of said assembly is in engagement with the other member.

4. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a first liquid-spreading member, means for mounting said member, a portion of said member having a convexly curved surface, a second liquid-spreading member having a convexly curved surface, means for mounting said second member to permit movement of said second member towards said first member, said two mounting means holding said two members so that said two convexly curved surfaces form a converging mouth, a pair of shoulders fixedly secured to said second member adjacent the ends of said convexly curved surface thereof, said shoulders maintaining said two surfaces spaced a predetermined distance apart upon engagement of said shoulders with said first member, end surface portions of said members being spaced apart farther than the convexly curved portions, and means for resiliently urging said second member towards said first member, said urging means maintaining said shoulders in engagement with margins of said assembly while the opposite surface of said assembly is in engagement with said first member.

5. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions and end portions of reduced diameter, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, and a pair of elements associated with one of said rolls adjacent the ends of the cylindrical portion thereof, a surface of each of said elements being spaced farther from the axis of said roll than the surface of said cylindrical portion thereof is spaced from said axis, said surfaces of said two elements being positioned so as to engage the other roll and to space said two rolls a predetermined distance apart, said urging means exerting a force on said second roll which is greater than the force exerted thereon by said viscous liquid during spreading of said viscous liquid between said sheets.

6. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a pair of parallel rotatably mounted liquid-spreading rolls having intermediate cylindrical portions and end portions of reduced diameter, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, at least one relatively incompressible spacing strip extending between said rolls adjacent one end of said cylindrical portions, said strip being thinner than said assembly, and means for holding said strip against movement thereof with said two sheets, said two intermediate cylindrical portions of said two rolls being held spaced apart by said strip a predetermined amount upon engagement of said rolls with said strip.

7. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a pair of parallel rotatably mounted liquid-spreading rolls having intermediate cylindrical portions and end portions of reduced diameter, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, a pair of relatively incompressible spacing strips extending between said rolls adjacent the two ends of said cylindrical portions, said strips being thinner than said assembly, and means for holding said strips against movement thereof with said two sheets, said two intermediate cylindrical portions of said two rolls being held spaced apart by said strips a predetermined amount upon engagement of said rolls with said strips.

8. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions and end portions of reduced diameter, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, a pair of sheet-edge-guiding surfaces associated with at least one of said mounting means, another pair of sheet-edge-guiding surfaces, each surface of one pair of guiding surfaces being substantially coplanar with a corresponding surface of the other pair, and at least one shoulder secured to one of said rolls adjacent one end thereof and inwardly of said portion of reduced diameter, said shoulder being of greater diameter than said intermediate cylindrical portion of its associated roll, said urging means being arranged to hold said shoulder in engagement with a margin of said assembly while the opposite surface of said assembly is engaged by said other roll.

9. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions and end portions of reduced diameter, mounting means for a first of said rolls, mounting means for the second of said rolls permitting movement of said second roll towards said first roll during spreading, means resiliently urging said second roll towards said first roll, and at least one shoulder secured to one of said rolls adjacent one end thereof and inwardly of said portion of reduced diameter, said shoulder being of greater diameter than said intermediate cylindrical portion of its associated roll, said urging means being arranged to hold said shoulder in engagement with a margin of said assembly while the opposite surface of said assembly is engaged by said other roll.

10. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, and at least one shoulder secured to one of said rolls adjacent one end thereof, said shoulder being of greater diameter than said intermediate cylindrical portion of its associated roll, said urging means being arranged to hold said shoulder in engagement with a margin of said assembly while the opposite surface of said assembly is engaged by said other roll.

11. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a pair of parallel rotatably mounted liquid-spreading rolls having intermediate cylindrical portions, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, and a pair of shoulders secured to said second roll adjacent the ends thereof, said shoulders being of greater diameter than said intermediate cylindrical portion of said roll, said urging means being arranged to hold said shoulders in engagement with margins of said assembly while the opposite surface of said assembly is engaged by said first roll, said urging means exerting a force on said second roll which is greater than the force exerted thereon by said viscous liquid during spreading of said viscous liquid between said sheets.

12. In a photographic apparatus of the class wherein a photosensitive sheet is processed in conjunction with another sheet by means of a viscous processing liquid spread between said sheets and wherein mounting means are provided for said sheets and so locate said sheets with respect to one another that said sheets may be drawn from said mounting means into superposed relation, said mounting means including guides for engaging the edges of said sheets to prevent transverse displacement of said sheets during their travel into superposed relation, the combination with said sheet-mounting means of liquid-spreading means having liquid-spreading members between which said sheets may be advanced in superposed assembly with the liquid therebetween, said liquid-spreading means being operative to compensate for variations in the thicknesses of said sheets so as to give a substantially uniform thickness of spread of said liquid over a predetermined part of the total width of said photosensitive sheet, said liquid-spreading means comprising a pair of parallel rotatably mounted liquid-spreading rolls having intermediate cylindrical portions and end portions of reduced diameter, mounting means for a first of said rolls maintaining the axis of said roll fixed with respect to said apparatus during spreading, mounting means for the second of said rolls permitting movement of said second roll towards said first roll during spreading, means resiliently urging said second roll towards said first roll, and a pair of shoulders rigidly secured to said second roll adjacent the ends thereof and inwardly of said portions of reduced diameter, said shoulders being of greater diameter than said intermediate cylindrical portion of said roll, said urging means being arranged to hold said shoulders in engagement with margins of said assembly while the opposite surface of said assembly is engaged by said first roll, said urging means exerting a force on said second roll which is greater than the force exerted thereon by said viscous liquid during spreading of said viscous liquid between said sheets.

13. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, means for mounting a first of said rolls, said mounting means maintaining the axis of said roll fixed with respect to said apparatus during spreading, means for mounting a second of said rolls to permit movement of said second roll towards said first roll, means for resiliently urging said second roll towards said first roll, said mounting for said movably mounted roll permitting the axis thereof to tilt slightly while maintaining said axis substantially coplanar with said axis of said other roll, said resilient urging means comprising a pressure member adapted to bear upon said mounting means for said movably mounted roll, a pair of springs bearing against said pressure member, there being one spring adjacent each end of said member and means preventing more than a predetermined amount of movement of said member under influence of said springs.

14. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, said apparatus comprising a front housing portion, a rear housing portion, and a partition between said front and rear housing portions, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of rotatably mounted liquid-spreading rolls having intermediate cylindrical portions, means for mounting a first of said rolls, said mounting means being secured to said rear housing portion, means for mounting said second roll to permit movement of said second roll towards said first roll, said second mounting means being secured to said partition, means for resiliently urging said second roll towards said first roll, said mounting for said movably mounted roll permitting the axis thereof to tilt slightly while maintaining said axis substantially coplanar with said axis of said other roll, said resilient urging means comprising a member adapted to bear upon said mounting means for said movably mounted roll and a pair of springs bearing against said member, there being one spring adjacent each end of said member, and means secured to said front housing portion for preventing more than a predetermined amount of movement of said member under influence of said springs.

15. In a photographic appartus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, means for mounting a first of said rolls, said mounting means maintaining the axis of said roll fixed with respect to said apparatus during spreading, means for mounting a second of said rolls to permit movement of said second roll towards said first roll, means for resiliently urging said second roll towards said first roll, said mounting for said movably mounted roll comprising a pair of plates supporting ends of said roll, said plates being independently movable in planes normal to the axis of said roll, thereby permitting the axis thereof to tilt slightly while maintaining said axis substantially coplanar with said axis of said other roll, said resilient urging means comprising a pressure member adapted to bear upon said plates, a pair of springs bearing against said pressure member, there being one spring adjacent each end of said member, and means preventing more than a predetermined amount of movement of said member under influence of said springs.

16. In a photographic appartus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, means for mounting a first of said rolls, said mounting means maintaining the axis of said roll fixed with respect to said apparatus during spreading, means for mounting a second of said rolls to permit movement of said second roll towards said first roll, means for resiliently urging said second roll towards said first roll, said mounting for said movably mounted roll comprising a pair of plates supporting ends of said roll, said plates being independently movable in planes normal to the axis of said roll, thereby permitting the axis thereof to tilt slightly while maintaining said axis substantially coplanar with said axis of said other roll, said resilient urging means comprising a pair of springs, there being one spring adjacent each plate.

17. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, said apparatus comprising a front housing portion, a rear housing portion, and a partition between said front and rear housing portions, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of rotatably mounted liquid-spreading rolls having intermediate cylindrical portions, means for mounting a first of said rolls, said mounting means being secured to said rear housing portion, means for mounting said second roll to permit movement of said second roll towards said first roll, said second mounting means being secured to said partition, means for resiliently urging said second roll towards said first roll, said mounting for said movably mounted roll comprising a pair of plates supporting ends of said roll, said plates being independently movable in planes normal to the axis of said roll, thereby permitting the axis thereof to tilt slightly while maintaining said axis substantially coplanar with said axis of said other roll, said resilient urging means comprising a member adapted to bear upon said plates and a pair of springs bearing against said member, there being one spring adjacent each end of said member, and means secured to said front housing portion for preventing more than a predetermined amount of movement of said member under influence of said springs.

18. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, said apparatus comprising a front housing portion, a rear housing portion, and a partition between said front and rear housing portions, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of rotatably mounted liquid-spreading rolls having intermediate cylindrical portions, means for mounting a first of said rolls, said mounting means being secured to said rear housing portion, means for mounting said second roll to permit movement of said second roll towards said first roll, said second mounting means being secured to said partition, means for resiliently urging said second roll towards said first roll, said mounting for said movably mounted roll comprising a pair of plates supporting ends of said roll, said plates being independently movable in planes normal to the axis of said roll, thereby permitting the axis thereof to tilt slightly while maintaining said axis substantially coplanar with said axis of said other roll, said resilient urging means comprising a pair of springs, there being one spring adjacent each end of said roll, and means secured to said front housing portion for preventing more than a predetermined amount of movement of said springs.

19. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, a pair of shoulders secured to one of said rolls adjacent the ends thereof, said shoulders being of greater diameter than said intermediate cylindrical portion of their associated roll, means for mounting a first of said rolls, said mounting means maintaining the axis of said roll fixed with respect to said apparatus during spreading, means for mounting a second of said rolls to permit movement of said second roll towards said first roll, means for resiliently urging said second roll towards said first roll, said mounting for said movably mounted roll permitting the axis thereof to tilt slightly while maintaining said axis substantially coplanar with said axis of said other roll, said resilient urging means comprising a pressure member adapted to bear upon said mounting means for said movably mounted roll, a pair of springs bearing against said pressure member, there being one spring adjacent each end of said member, and means preventing more than a predetermined amount of movement of said member under influence of said springs.

20. In a photographic apparatus of the class wherein a photosensitive sheet is processed in conjunction with another sheet by means of a viscous processing liquid contained in a plurality of podlike containers, which containers are successively positioned between said sheets as the latter are superposed and from which containers the contents are released and spread in a layer between said sheets and wherein mounting means are provided for said sheets and containers from which said sheets and successive containers may be advanced into superposed assembly, the combination with said sheet-mounting means of liquid-releasing and spreading means having members between which said sheets may be advanced into superposed position with a container therebetween, said liquid-releasing and spreading means releasing the container contents and permitting the empty containers to pass between said members together with said sheets and being operative to compensate for variations in the thicknesses of said sheets so as to give a substantially uniform thickness of spread of said liquid over a predetermined part of the total width of said photosensitive sheet between successive containers, said liquid-releasing and spreading means comprising a pair of parallel rotatably mounted liquid-spreading rolls having intermediate cylindrical portions, a pair of relatively incompressible spacing strips extending between said rolls adjacent the ends thereof, means for holding said strips against movement thereof with said two sheets, means for mounting a first of said rolls, said mounting means maintaining the axis of said roll fixed with respect to said apparatus during spreading, means for mounting a second of said rolls to permit movement of said second roll towards said first roll, means for resiliently urging said second roll towards said first roll, said mounting for said movably mounted roll permitting the axis thereof to tilt slightly while maintaining said axis substantially coplanar with said axis of said other roll, said resilient urging means comprising a pressure member adapted to bear upon said mounting means for said movably mounted roll, a pair of springs bearing against said pressure member, there being one spring adjacent each end of said member, and means preventing more than a predetermined amount of movement of said member under influence of said springs.

21. The apparatus of claim 1 wherein the cooperating portions of said liquid-spreading means engaging the margins of the sheet assembly comprise a pair of shoulders fixedly secured to one of said liquid-spreading members.

22. The apparatus of claim 1 wherein the cooperating portions of said liquid-spreading means engaging the margins of the sheet assembly comprise a pair of relatively incompressible spacing strips extending between said members adjacent the ends of said convexly curved surfaces thereof and means for holding said strips against movement with said sheets.

MURRY N. FAIRBANK.

REFERENCES CITED

The following references are of record in the file of this patent:

UNITED STATES PATENTS

| Number | Name | Date |
| --- | --- | --- |
| 1,057,412 | Day | Apr. 7, 1913 |
| 1,424,816 | Grillone | Apr. 8, 1922 |
| 1,819,848 | Simjian | Aug. 18, 1931 |
| 1,927,886 | Burns | Sept. 26, 1933 |
| 2,036,442 | Tanatar | Apr. 7, 1936 |
| 2,079,849 | Gelb | May 11, 1937 |
| 2,097,059 | Ensign | Oct. 26, 1937 |
| 2,154,585 | Samandji | Apr. 18, 1939 |
| 2,166,643 | Salfisberg | July 18, 1939 |
| 2,374,504 | Salfisberg | Apr. 24, 1945 |
| 2,376,204 | Sullivan | May 15, 1945 |
| 2,435,719 | Land | Feb. 10, 1948 |